(12) United States Patent
Capriotti et al.

(10) Patent No.: US 10,315,375 B2
(45) Date of Patent: Jun. 11, 2019

(54) WORK STATION FOR A PACKAGING MACHINE

(75) Inventors: Luciano Capriotti, Bad Groenenbach (DE); Elmar Ehrmann, Bad Groenenbach (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 1300 days.

(21) Appl. No.: 13/328,192

(22) Filed: Dec. 16, 2011

(65) Prior Publication Data

US 2012/0151875 A1 Jun. 21, 2012

(30) Foreign Application Priority Data

Dec. 16, 2010 (DE) .................... 10 2010 054 773

(51) Int. Cl.
*B65B 65/00* (2006.01)
*B30B 1/42* (2006.01)
(Continued)

(52) U.S. Cl.
CPC ............... *B30B 1/42* (2013.01); *B29C 65/18* (2013.01); *B29C 65/305* (2013.01); *B29C 66/00145* (2013.01); *B29C 66/112* (2013.01); *B29C 66/131* (2013.01); *B29C 66/53461* (2013.01); *B29C 66/81427* (2013.01); *B29C 66/8227* (2013.01); *B29C 66/8244* (2013.01);
(Continued)

(58) Field of Classification Search
CPC ........... B30B 1/261; B30B 1/42; B65B 59/04; B65G 57/04; H01R 43/048; Y10S 72/707; B29C 65/00; B29C 66/849; B29C 65/18; B29C 66/8491; B25B 11/002; H01F 2007/1692; H01F 2007/1684; H01F 7/122; H01F 7/1646
USPC ..................................... 53/285, 329
See application file for complete search history.

(56) References Cited

U.S. PATENT DOCUMENTS 2,915,681 A * 12/1959 Troy .............................. 361/144
3,481,100 A * 12/1969 Bergstrom .............. B65B 31/02
426/392
(Continued)

FOREIGN PATENT DOCUMENTS

DE 1586092 A1 4/1970
DE 2726875 A1 1/1979
(Continued)

OTHER PUBLICATIONS

German Office Action dated Apr. 1, 2011, Applicant MULTIVAC Sepp Haggenmueller GMBH & Co. KG, Application No. 10 2010 054 773.5-27. 3 Pages.
(Continued)

*Primary Examiner* — Chelsea E Stinson
(74) *Attorney, Agent, or Firm* — Husch Blackwell LLP

(57) ABSTRACT

A work station for a packaging machine comprises a tool structure and a tool movable relative to the tool structure by means of a drive. The drive comprises at least one counter-magnet which is operatively connectable to an electromagnet and movable relative to the electromagnet. The drive further comprises a mechanism by means of which the movement of the tool is unidirectionally coupled to the relative movement of the countermagnet relative to the electromagnet.

17 Claims, 2 Drawing Sheets

(51) Int. Cl.
   *B65B 9/04*   (2006.01)
   *B65B 31/02*  (2006.01)
   *B29C 65/18*  (2006.01)
   *B29C 65/00*  (2006.01)
   *B29C 65/30*  (2006.01)
   *B29C 65/74*  (2006.01)
   *B65B 7/16*   (2006.01)
   *B65B 65/02*  (2006.01)

(52) U.S. Cl.
   CPC ........ *B29C 66/8322* (2013.01); *B29C 66/849* (2013.01); *B65B 9/04* (2013.01); *B65B 31/021* (2013.01); *B65B 65/00* (2013.01); *B29C 65/7451* (2013.01); *B65B 7/164* (2013.01); *B65B 65/02* (2013.01)

(56) References Cited

U.S. PATENT DOCUMENTS

| | | | | |
|---|---|---|---|---|
| 3,955,688 | A * | 5/1976 | Jones | ........................ 414/792.9 |
| 4,268,598 | A | 5/1981 | Leseman et al. | |
| 4,515,343 | A * | 5/1985 | Pischinger | ................ F01L 1/16 |
| | | | | 123/90.11 |
| 4,583,350 | A | 4/1986 | Artusi et al. | |
| 4,965,695 | A * | 10/1990 | Baumann | ...................... 361/142 |
| 4,982,555 | A * | 1/1991 | Ingemann | ............ B65B 31/028 |
| | | | | 156/68 |
| 5,086,633 | A | 2/1992 | Meyerle | |
| 6,192,733 | B1 * | 2/2001 | Long et al. | ..................... 72/430 |
| 6,538,544 | B1 * | 3/2003 | Hardy | .................. B25B 11/002 |
| | | | | 294/192 |
| 2002/0093408 | A1 * | 7/2002 | Morita et al. | ................ 335/220 |
| 2009/0272075 | A1 * | 11/2009 | Biechteler | ....................... 53/285 |

FOREIGN PATENT DOCUMENTS

| | | | |
|---|---|---|---|
| DE | 20312512 U1 | 12/2003 | |
| EP | 1506925 A1 * | 2/2005 | ............ B65B 31/02 |
| FR | 2908739 A1 | 5/2008 | |

OTHER PUBLICATIONS

Extended European Search Report dated Apr. 17, 2012, Applicant MULTIVAC Sepp Haggenmueller GmbH & Co KG, Application No. 11009157.6-2308. 5 Pages.

* cited by examiner

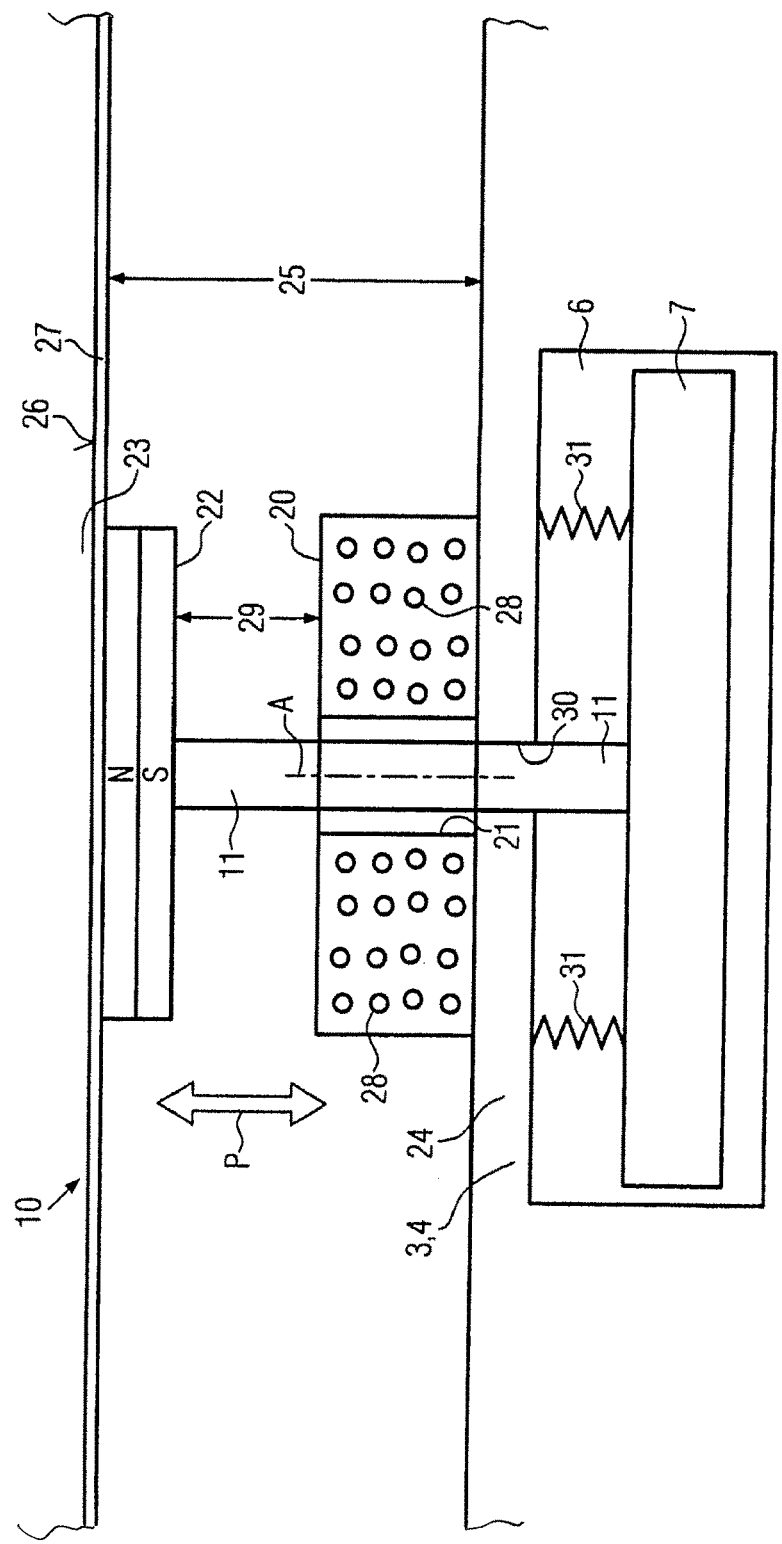

WORK STATION FOR A PACKAGING MACHINE

CROSS-REFERENCE TO RELATED APPLICATIONS

This application claims foreign priority benefits under 35 U.S.C. § 119(a)-(d) to German patent application number DE 10 2010 054 773.5, filed Dec. 16, 2010, which is incorporated by reference in its entirety.

TECHNICAL FIELD

The disclosure relates to a work station for a packaging machine.

BACKGROUND

Such a work station is disclosed by DE 27 26 875 A1, where said work station even constitutes the whole packaging machine. The packaging machine described there serves to seal plastic bags, a carrying handle being simultaneously cut into the plastic bags. As soon as a plastic bag is pushed into the insertion slot of the machine, it actuates a microswitch which, in turn, activates an electromagnet. The electromagnet attracts a piston which is supported in the interior thereof and which moves relative to the electromagnet. This movement is deflected in a mechanically comparatively complicated manner and transmitted to a movement of the sealing and cutting tool.

SUMMARY

It is an object of the present disclosure to improve the sequence of operations of a work station for a packaging machine with means having the simplest possible structural design.

In a work station according to the present disclosure a mechanism is provided, by means of which the movement of the tool is unidirectionally and, preferably, directly coupled to the relative movement of the countermagnet relative to the electromagnet. Direct coupling means here that the movement of the movable magnet is directly transmitted to a movement of the tool, without any transformation or change of direction in the movement being effected. Making use of such a unidirectional and preferably also direct coupling, the mechanism used for the purpose of coupling is rendered much less complex than prior art mechanisms. This, in turn, means a reduction of the space occupied by the drive used for the tool, and, in view of the reduced complexity, the drive is much less susceptible to operational faults.

The work station according to the present disclosure can be used for all imaginable types of packaging machines in which a movable tool is used. The work station can, for example, be a sealing or cutting station in a thermoform packaging machine, a tray sealer, a bag sealer, a chamber machine or a belted chamber machine, but it may also be a cutting station or a forming station in a thermoform packaging machine. Depending on the function of the work station, the movable tool may e.g. be a (thermoforming) tool, a sealing tool or a cutting tool.

The electromagnet preferably defines an axial direction with respect to which the electromagnet and/or the magnetic field generated thereby are axially symmetric. According to a particularly advantageous embodiment, the electromagnet and the countermagnet are spaced apart in this axial direction by a gap of variable width. It should here be taken into account that the magnetic attractive forces (or repulsive forces) are, to a good approximation, inversely proportional to the third power of this gap width d, i.e., the magnetic forces are proportional to $1/d^3$. In contrast to a conventional armature which centrally penetrates the electromagnet, the axial spacing of the electromagnet and the countermagnet leads to attractive forces increasing with the third power of said spacing when the distance between the electromagnet and the countermagnet decreases. Through this effect, the drive according to the present invention is able to accomplish extremely high forces primarily in the last phase of movement of the movable magnet. These forces can, in turn, be used for accomplishing very high cutting and/or sealing forces acting on the workpiece, i.e., a packaging film or a package to be formed.

According to a particularly advantageous embodiment, the countermagnet is a flat magnet, i.e., a magnet whose dimensions in the axial direction of the drive are smaller than those in the radial direction. This shape allows the countermagnet, for example, to cooperate with a large area of the electromagnet. In addition, the flat magnet provides for a small overall size in the axial direction of the drive. It would, for example, be imaginable that the electromagnet and the countermagnet have approximately the same dimensions in the axial direction of the electromagnet, the difference being not more than 10%.

In the work station according to the present disclosure, the electromagnet may be coupled either to the tool structure or to the tool. Power supply to the electromagnet will, however, be easier when the electromagnet is coupled to the fixed tool structure, whereas the countermagnet de-fines the movable magnet of the drive.

This countermagnet is preferably a second electromagnet or a permanent magnet. The permanent magnet has the advantage that it need not be supplied with current so that the complexity of the drive system will be reduced still further.

It would also be imaginable that the countermagnet is not a permanent magnet, but that it only comprises a magnetizable material. In some cases of use, this has the advantage that a magnetic field does not exist in the work station permanently, but only in the case of an activation of the electromagnet and the resultant magnetization of the countermagnet.

According to an advantageous variant of the disclosure, a docking magnet is provided for docking thereto the magnet which is movable relative to the tool structure, when said magnet is at a position of rest. The countermagnet preferably occupies this position of rest, when the electromagnet is inactive. At the position of rest, the docking magnet ensures a defined position of the movable magnet. The movable magnet is, for example, prevented from freely moving in the work station, when the electromagnet is deactivated for the purpose of maintenance or cleaning.

In a simple case, the docking magnet may be a stainless steel plate. Such a stainless steel plate may be provided in the tool structure anyhow. In order to increase the magnetic force of the stainless steel plate, the latter may in particular be a ferritic stainless steel plate, i.e., a stainless steel which is purposefully feritically more heavily doped (i.e., doped with iron atoms). The percentage of iron may, for example, be increased by 5 to 20% in comparison with conventional stainless steel. Alternatively, the docking magnet may also be an electromagnet, for example.

According to an expedient embodiment, the docking magnet and/or the magnet which is movable relative to the tool structure have/has a surface that is provided with a damping material. The damping material guarantees that the movable magnet will be in gentle contact with the docking magnet. In this way, it guarantees that the movable magnet will move gently into contact with the docking magnet, and prevent thus damage to one of the two magnets as well as excessive noise development. The damping material may, for example, be rubber, silicone or an elastic, e.g. polymeric plastic material.

According to one variant of the disclosure, at least one spring is provided for biasing the tool. This biasing force may be directed towards the operating position as well as towards the position of rest of the tool. It will be particularly advantageous when the force of the spring is directed towards the position of rest of the tool, since this position of rest is normally an open position of the movable tool, in which, if power failure should occur or if the electromagnet should have been deactivated, the tool can be exchanged or packaging material can be removed from the work station.

When guide means are provided for the tool, the movement of the latter can take place even more smoothly and in an even better defined manner. In addition, the guide means can, for example, absorb transverse forces acting on the tool.

The tool structure may, for example, be configured such that it can be used for forming a hermetically sealed chamber around the tool. In this way, the work station can be used for evacuating and/or gas flushing the packages to be produced.

Special advantages are accomplished when the electromagnet is adapted to have pulsed current supplied thereto, e.g., when a control unit is provided, which ensures that the electromagnet is supplied with such pulsed current, since this allows a fine adjustment of the attractive or repulsive forces generated by the electromagnet. The pulsed current may here be supplied in a homopolar manner, i.e., between zero and a maximum value of the current, as well as in a non-homopolar manner, i.e., between a negative and a positive maximum value of the current.

It will be particularly advantageous, when the frequency of the pulsed current supplied to the electromagnet is adjustable. In this way, the force generated by the electromagnet and acting on the countermagnet can be adjusted in several steps or even continuously. Neighboring intervals of the pulsed current need not necessarily have the same length. It is thus possible to achieve arbitrary motion curves or, more precisely, speed curves of the movable magnet.

It is, for example, imaginable that, when the movable magnet approaches the docking magnet, the electromagnet is adapted to have supplied thereto a predetermined sequence of current pulses with varying pulse frequencies. This predetermined sequence of current pulses may be chosen such that the movable magnet moves into contact with the docking magnet quickly but nevertheless gently.

The disclosure also relates to a packaging machine comprising a work station according to one of the above-described variants. As has already been explained, the packaging machine may, for example, be a thermoformer, a tray sealer, a bag sealer or a chamber machine.

In the following, an advantageous embodiment of the disclosure will be explained in more detail with reference to the below drawings.

BRIEF DESCRIPTION OF THE DRAWINGS

FIG. 2 is a schematic representation of an embodiment of the drive in a work station according to the present disclosure.

DETAILED DESCRIPTION

Figure 1:
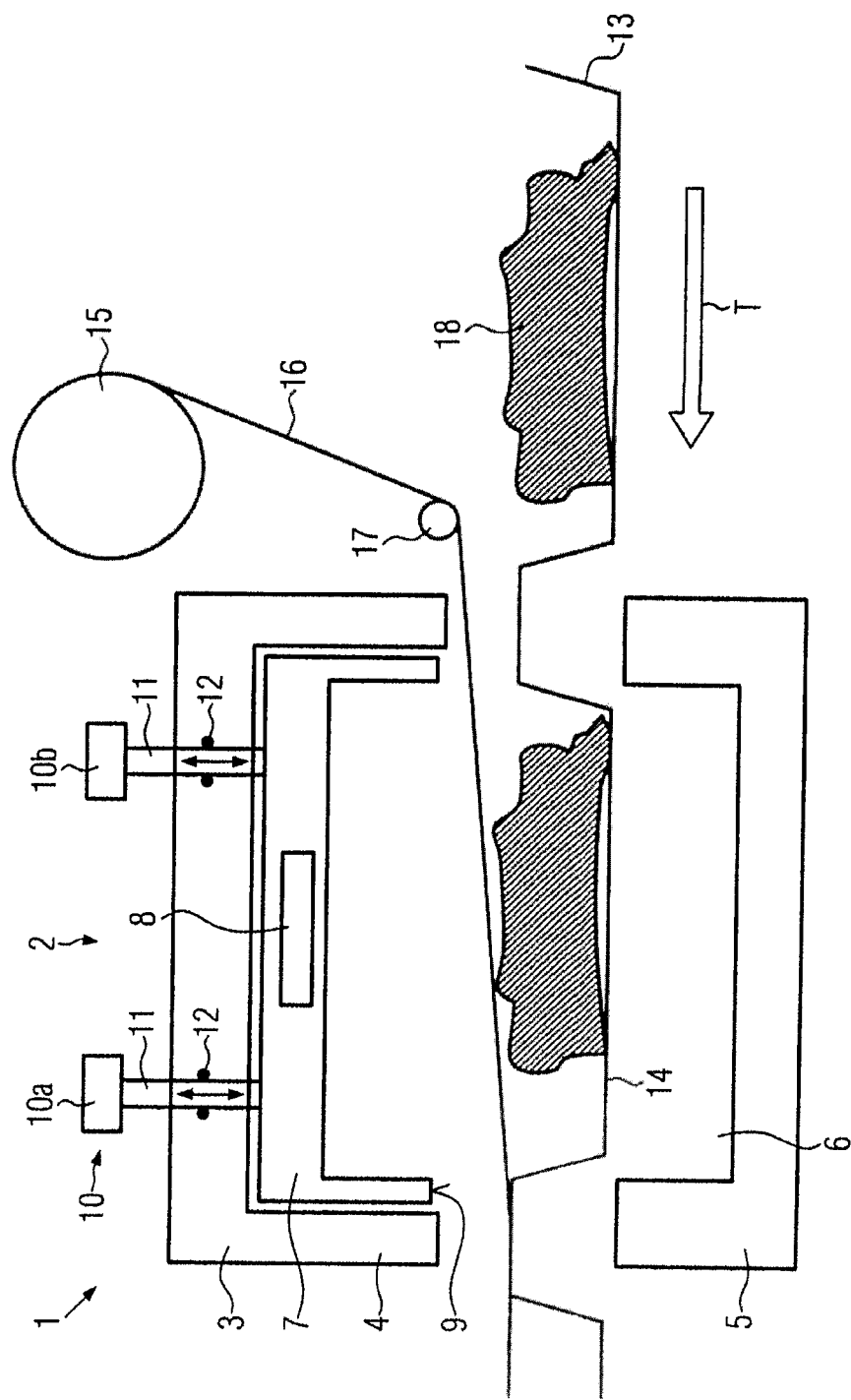
FIG. 1 is a schematic vertical section through a work station according to the present disclosure.

Identical components are designated by identical reference numerals throughout the figures.

FIG. 1 shows schematically a vertical section through a detail of a packaging machine 1, viz. a work station 2 of this packaging machine 1. In the present case, said work station 2 is a sealing station 2 of the packaging machine 1.

The work or sealing station 2 has a tool structure 3. This tool structure 3 comprises a chamber upper part 4 and a chamber lower part 5. The two chamber parts 4, 5, which are shown in FIG. 1 at an open position, can be moved towards one another so as to form together a hermetically sealed sealing chamber 6.

In the interior of the tool structure 3, in the present embodiment in the interior of the chamber upper part 4, a tool 7 is provided, which is movable relative to the tool structure 3. In the present embodiment, said tool 7 is a sealing tool 7. The sealing tool 7 is used for sealing two packaging films to one another by applying a sealing temperature and, if necessary, an additional sealing pressure to the two packaging films/foils 13, 16. To this end, the sealing tool 7 is provided with one or a plurality of heating elements 8 and with a sealing edge 9 at which the sealing tool 7 can be brought into contact with the packaging films to be sealed. The heating elements 8 provide for heating of the sealing edge 9 to the desired sealing temperature.

A drive 10 provides for a movement of the sealing tool 7 relative to the tool structure 3. In the present embodiment, the drive 10 comprises a first drive 10a and a second drive 10b which is synchronized with the first one. Each of these two drives 10a, 10b is provided outside of the sealing chamber 6 on the tool structure 3 and connected to the sealing tool 7 by means of a transfer mechanism, in the present case a simple transfer rod 11. In the tool structure 3 the transfer rod 11 is guided in a matching opening. The transfer rod 11 is sealed against the tool structure 3 by means of a sealing 12.

The chamber lower part 5 of the tool structure 3 is shaped such that it is able to accommodate a packaging trough 14, which has been thermoformed from a first packaging film/foil 13. A second packaging film 16, which is also referred to as top film 16, is unwound from a roll 15, which is supported outside of the tool structure 3 on the work station 2. The first packaging film/foil, or bottom film/foil 13, and the second packaging film 16 are sealable to one another; each of said films/foils may consist of sealable plastic materials. The second packaging film 16 is guided over a deflection pulley 17 so as to be fed into the work station 2 approximately parallel to the first packaging film/foil 13.

When the packaging machine 1 is in operation, the packaging troughs 14 are thermoformed in the bottom film/foil 13 in a molding station (not shown). Subsequently, products 18 are filled into the packaging troughs 14 in a filling station, before the filled packaging troughs 14 are conveyed in the direction of transport T into the sealing station 2. Simultaneously, also the second pack-aging film 16 is conducted into the sealing station 2 such that it is positioned above the packaging troughs 14.

In the next step, the two chamber parts 4, 5 are moved towards one another so as to define in common a hermetically sealed sealing chamber 6. During this movement, the sealing tool 7 does not move relative to the tool structure 3, i.e. it does not move relative to the chamber upper part 4.

As soon as the sealing chamber 6 has been hermetically sealed, the packaging trough 14 filled with the product 18 can be evacuated and/or flushed with a replacement gas or a replacement gas mixture. As soon as this process has been finished, the sealing tool 7 moves downwards relative to the tool structure 3. This movement is produced by the drive 10, which will be explained in more detail on the basis of FIG. 2. The movement of the sealing tool 7 generates a sealing pressure acting on the top film 16. Simultaneously, the top film is heated to its sealing temperature at the sealing edges 9 of the sealing tool 7 so as to be sealed to the bottom film/foil 13.

Optionally, the sealing station 2 may also comprise a cutting tool between the chamber upper part 4 and the sealing tool 7, said cutting tool being movable relative to the tool structure 3 by means of a separate drive 10. This drive 10 can have the same structural design as the drive 10 of the sealing tool 7. The cutting tool is then movable independently of the sealing tool 7.

When the sealing chamber 6 has been opened, the sealed packages are removed from the sealing station 2 in the direction of transport T. The residual film grid of the top film 16 can be collected, if desired, on a residual foil winder (not shown).

FIG. 2 shows, in a schematic representation, the drive 10 for the movable tool 7, said drive 10 being used in a work station 2 according to the present disclosure.

FIG. 2 shows schematically the sealing tool 7, which is movable in the sealing chamber 6 relative to the tool structure 3, in particular relative to the chamber upper part 4, in the vertical direction indicated by the double arrow P. To this end, a drive 10 for the movable tool 7 is provided outside of the sealing chamber 6, in particular on or in the chamber upper part 4. This drive 10 comprises an electromagnet 20. This electromagnet 20 defines, through its shape, a central axis A with respect to which the electromagnet is axially symmetric. Transversely to the axial direction A, the electromagnet 20 may have e.g. a circular or a square cross-section.

The electromagnet 20 is provided with a through hole 21 along the central axis A. The transfer rod 11 extends through this through hole 21. A lower end of the transfer rod 11 is fixedly coupled to the movable tool 7. The opposite, upper end of the transfer rod 11 is coupled to a countermagnet 22. In the present embodiment, the countermagnet 22 is a permanent magnet configured as a flat magnet. "Flat magnet" means in this context that the dimensions of the countermagnet 22 transversally to the axial direction A are larger than those in the axial direction A. In FIG. 2 reference symbol N stands for the north pole and reference symbol S stands for the south pole of the countermagnet 22. The south pole is directed towards the electromagnet 20. The shape and the area of the countermagnet 22 transversally to the axial direction A may be approximately or even exactly identical to the area of the electromagnet 20 transversally to the axial direction A.

Above the countermagnet 22 a docking magnet 23 is provided. In the present embodiment, the docking magnet 23 is a plate consisting of a magnetic or magnetizable material, e.g., a feritically more heavily doped stainless steel, which, in turn, is part of the fixed tool structure 3. An air gap 25, within which the countermagnet 22 is movable in direction P, is provided between the stain-less steel plate used as a docking magnet 23 and a horizontal wall 24 of the tool structure 3 on or in which the electromagnet 20 is provided.

By means of the transfer mechanism 11, which is configured as a transfer rod in the present embodiment, the movement of the counter magnet 22 is coupled to the movement of the movable tool 7 directly (i.e., without any transformation) and unidirectionally, i.e., when the countermagnet 22 executes a movement in the direction P, also the movable tool 7 will execute a movement with the same amplitude and in the same direction P.

In the position shown in FIG. 2, the countermagnet 22 occupies its position of rest in which it is docked to the docking magnet 23. The docking magnet surface 26 facing the countermagnet 22 has provided thereon a damping material 27, for example rubber or an elastic plastic material. This damping material 27 ensures that the countermagnet 22 will move into contact with the docking magnet 23 gently and without causing damage. The magnetic or magnetizable material of the docking magnet 23 interacts with the magnetic field of the countermagnet 22 so as to hold the latter on the docking magnet 23 by magnetic forces.

When the sealing tool 7 is to be lowered, a control unit (not shown) ensures that a current flows through the windings 28 of the electromagnet 20. The electromagnet 20 then develops a magnetic field of its own, which attracts the countermagnet 22. As soon as this attractive force exceeds the holding force applied by the docking magnet 23 to the countermagnet 22, the countermagnet 22 will move downwards in the direction of the electromagnet 20. This movement causes a decrease in the width of the gap 29 defined between the surface of the electromagnet 20 and the surface of the countermagnet 22 which face one another. Even if the current in the windings 28 remains the same, the decrease in the distance between the two magnets 20, 22 will increase the attractive forces applied by the electromagnet 20 to the countermagnet 22. This has the effect that the movement of the countermagnet 22 towards the electromagnet 20 is accelerated still further. This acceleration continues until the tool 7, which is coupled to the countermagnet 22 via the transfer mechanism 11, encounters an obstacle, e.g., a film to be sealed. The way in which the magnets 20, 22 are arranged in the drive 10 of the tool 7 according to the present disclosure guarantees that, at this moment, the tool 7 will be able to exert the highest possible pressure downwards. This pressure can be used, for example, for sealing or—if the tool 7 should be a cutting tool—for cutting packaging films.

As soon as the operating step to be executed by the tool 7 has been carried out, the tool 7 can be returned from its operating position to the position of rest shown in FIG. 2. To this end, the direction of the current flowing in the windings 28 of the electromagnet 20 is reversed so as to generate a repulsive force acting on the countermagnet 22. The latter will therefore move up-wards onto the docking magnet 23.

The drive according to the present disclosure offers the possibility of supplying the electromagnet 20 with pulsed current. This current supply can take place according to the pulse wave modulation (PWM) principle, in the case of which the frequency and/or the duration of the individual current pulses can be adjusted. This adjustment is carried out through a central control.

The supply of a pulse-wave-modulated current to the electromagnet 20 ensures that the motion profile of the countermagnet 22 can be controlled precisely. This allows, for example, the countermagnet 22 to be accelerated in its upward movement to the highest possible extent, before it is decelerated, in good time, prior to reaching the docking magnet 23. This deceleration is accomplished by supplying the electromagnet 20 with current in a suitable manner and generating thus an attractive force acting on the countermagnet 22. This mode of operation of the drive 10 ensures that the countermagnet 22 moves into contact with the docking magnet 23 gently and without any damage being caused.

The horizontal wall 24 of the tool structure 3 has provided therein an opening whose shape and diameter are adapted to the shape and the diameter of the transfer rod 11 and which is therefore used as a guide means 30 for the vertical movement of the tool 7. In addition, tension springs 31 are provided between the tool structure 3 and the tool 7, said tension springs 31 being arranged as symmetrically as possible with respect to the point where the transfer mechanism 11 acts on the tool 7. These tension springs 31 bias the tool 7 towards its upper position of rest. This has the advantage that the tool 7 will move to its position of rest, if current should no longer flow through the electromagnet 20, e.g. in the case of power failure or malfunction.

Starting from the embodiment shown, the work station 2 according to the present disclosure and the drive 10 used therein can be modified in many ways. For example, it would be imaginable that the movable tool 7 is provided with only one drive 10 (as shown in FIG. 2) or with a plurality of drives 10a, 10b (as shown in FIG. 1). It has already been explained that the tool 7 may e.g. be a sealing tool or a cutting tool in a sealing station 2. Likewise, the tool 7 may be a molding tool used in a molding station for thermoforming the bottom film/foil 13.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, the features of various implementing embodiments may be combined to form further embodiments of the invention. In addition, other embodiments may be practiced without one or more of the specific features explained in the above description.

What is claimed is:

1. A work station for a packaging machine, the work station comprising:
    a tool structure comprising an upper part and a lower part, the upper part and the lower part defining a chamber and being disposed for movement relative to each other between an open position and a closed position, the chamber being hermetically sealed in the closed position;
    a tool disposed within the chamber of the tool structure and the tool being disposed for movement relative to the tool structure;
    a guide disposed for guiding movement of the tool relative to the tool structure; and
    a drive for moving the tool relative to the tool structure, wherein the drive is operably connected to the tool with a transfer device, the drive comprising an electromagnet for selectively creating an electromagnetic force upon the application of an electrical current through the electromagnet, a countermagnet operably connected to the transfer device, wherein the countermagnet is disposed for linear movement between a position of rest and an operating position, and wherein the countermagnet is selectively moved between the position of rest and the operating position to move the tool by selectively applying an electrical current through the electromagnet to apply one of an attraction force or a repulsion force upon said countermagnet.

2. A work station according to claim 1 wherein the tool device is disposed for movement in an axial direction, and the electromagnet and the countermagnet are spaced apart in the axial direction by a gap of variable width.

3. A work station according to claim 2 wherein the drive is configured such that when an electrical current is selectively applied to the electromagnet to apply an attraction force to the countermagnet, the attraction force between the electromagnet and the countermagnet increases as the width of the gap between the electromagnet and the countermagnet decreases.

4. A work station according to claim 1 wherein the countermagnet is a flat magnet.

5. A work station according to claim 1 wherein the electromagnet is coupled to the tool structure or to the tool.

6. A work station according to claim 1 wherein the countermagnet is a second electromagnet or a permanent magnet.

7. A work station according to claim 1 wherein the countermagnet comprises a magnetizable material.

8. A work station according to claim 1 further comprising a docking magnet for docking thereto the countermagnet when or the countermagnet is at the position of rest.

9. A work station according to claim 8 wherein the docking magnet comprises a magnetic stainless steel plate.

10. A work station according to claim 8 wherein at least one of the docking magnet, the electromagnet or the countermagnet has a surface that is provided with a damping material.

11. A work station according to claim 1 further comprising at least one spring associated with the tool for biasing the tool.

12. A work station according to claim 1 wherein the electrical current selectively applied to the electromagnet is a pulse-wave-modified current.

13. A work station according to claim 12, further comprising a docking magnet disposed to retain the countermagnet in the position of rest, wherein when the countermagnet moves toward the position of rest and the docking magnet, the electromagnet is adapted to have supplied thereto a predetermined sequence of current pulses having a varying pulse frequency for decelerating the countermagnet as the countermagnet approaches the position of rest.

14. A work station for a packaging machine, the work station comprising:
    a tool structure comprising an upper part and a lower part, the upper part and the lower part defining a chamber, the upper part and the lower part being disposed for an opening and a closing movement, wherein the chamber is hermetically sealed upon completion of said closing movement of the upper part and the lower part;
    a tool disposed within the chamber and the tool disposed for movement relative to the tool structure;
    a guide device for guiding the movement of the tool in a pre-determined path; and
    a drive operably connected to the tool by a transfer device, the drive moves the tool relative to the tool structure, the drive comprising an electromagnet for selectively creating an electromagnetic force upon the application of an electrical current through the electromagnet, a countermagnet operably connected to the transfer device, wherein the countermagnet is disposed for linear movement between a position of rest and an operating position, and wherein the countermagnet is selectively moved between the position of rest and the operating position to move the tool by selectively applying an electrical current through the electromagnet to apply one of an attraction force or a repulsion force upon said countermagnet;

wherein said guide device engages one of the tool or the transfer device to guide the movement of the tool relative to the tool structure.

15. A work station for a packaging machine, the work station comprising:
    a tool structure, the tool structure comprising an upper part and a lower part, the upper part and the lower part of the tool structure are disposed for movement relative to each other in operation to be closed to form a hermetically sealed chamber around a tool;
    the tool being disposed within the chamber and disposed for movement relative to the tool structure;
    a drive for moving the tool relative to the tool structure within the chamber, wherein the drive is operably connected to the tool with a transfer device, the drive comprising an electromagnet for selectively creating an electromagnetic force upon the application of an electrical current through the electromagnet, a countermagnet operably connected to the transfer device, wherein the countermagnet is disposed for linear movement between a position of rest and an operating position, and wherein the countermagnet is selectively moved between the position of rest and the operating position to move the tool by selectively applying an electrical current through the electromagnet to apply one of an attraction force or a repulsion force upon said countermagnet; and
    a docking magnet for retaining the countermagnet thereon in the position of rest of the countermagnet.

16. A work station according to claim 15 wherein the tool is operably connected to the transfer device in the position of rest and the operating position.

17. A work station according to claim 16 wherein the countermagnet has a first side and a second side, said docking magnet disposed on a first side of said countermagnet and said electromagnet disposed on a second side of said countermagnet.

* * * * *